US010764056B2

(12) United States Patent
Senyuk et al.

(10) Patent No.: US 10,764,056 B2
(45) Date of Patent: Sep. 1, 2020

(54) SHORT-DISTANCE NETWORK ELECTRONIC AUTHENTICATION

(71) Applicants: Oleksandr Senyuk, Kirkland, WA (US); Habtamu Feyessa, Bothel, WA (US); Vladyslav Kozlovskyy, Chernivtsi (UA); Petro Ladkin, Ivano-Frankivsk Region (UA)

(72) Inventors: Oleksandr Senyuk, Kirkland, WA (US); Habtamu Feyessa, Bothel, WA (US); Vladyslav Kozlovskyy, Chernivtsi (UA); Petro Ladkin, Ivano-Frankivsk Region (UA)

( * ) Notice: Subject to any disclaimer, the term of this patent is extended or adjusted under 35 U.S.C. 154(b) by 323 days.

(21) Appl. No.: 15/869,540

(22) Filed: Jan. 12, 2018

(65) Prior Publication Data

US 2018/0198621 A1 Jul. 12, 2018

Related U.S. Application Data

(60) Provisional application No. 62/445,655, filed on Jan. 12, 2017.

(51) Int. Cl.
*H04L 9/32* (2006.01)
*G06F 21/35* (2013.01)
(Continued)

(52) U.S. Cl.
CPC ............ *H04L 9/3234* (2013.01); *G06F 21/32* (2013.01); *G06F 21/35* (2013.01); *H04L 9/321* (2013.01);
(Continued)

(58) Field of Classification Search
CPC .... H04L 9/3234; H04L 63/0884; G06F 21/35
See application file for complete search history.

(56) References Cited

U.S. PATENT DOCUMENTS 9,032,498 B1 * 5/2015 Ben Ayed ........... H04L 63/0853
726/9
9,264,419 B1 * 2/2016 Johansson ............. H04L 9/3278
(Continued)

*Primary Examiner* — Lynn D Feild
*Assistant Examiner* — Viral S Lakhia
(74) *Attorney, Agent, or Firm* — Mohr Intellectual Property Law Solutions, PC

(57) ABSTRACT

Methods of short-distance network electronic authentication are described. In one embodiment, a method includes storing encrypted authentication data for a user and a corresponding encryption key on a mobile device; establishing electronic communication between the mobile device and a computer via a short distance network; detecting a request for user-specific authentication data from a third-party application running on the computer; requesting, via an authentication client on the computer, authentication credentials from an authentication service running on the mobile device; accessing, via the authentication service, in response to the requesting step, the encrypted authentication data and encryption key; decrypting the authentication data using the encryption key via the authentication service; transmitting the decrypted authentication data to the authentication client on the client computer; passing the decrypted authentication data from the authentication client to the third-party application; and authenticating the user in the third-party application.

20 Claims, 5 Drawing Sheets

(51) Int. Cl.
    *H04L 29/06*     (2006.01)
    *H04W 12/06*    (2009.01)
    *H04W 4/80*      (2018.01)
    *G06F 21/32*     (2013.01)
    *H04L 29/08*     (2006.01)

(52) U.S. Cl.
    CPC ........ *H04L 9/3231* (2013.01); *H04L 63/0492* (2013.01); *H04L 63/0853* (2013.01); *H04L 63/0884* (2013.01); *H04W 4/80* (2018.02); *H04W 12/06* (2013.01); *H04L 63/083* (2013.01); *H04L 63/0861* (2013.01); *H04L 67/02* (2013.01); *H04L 2209/80* (2013.01)

(56) References Cited

U.S. PATENT DOCUMENTS

| | | | |
|---|---|---|---|
| 9,413,754 B2* | 8/2016 | Stuntebeck | H04L 63/0846 |
| 9,515,836 B2* | 12/2016 | Tredoux | H04L 9/3297 |
| 10,009,351 B2* | 6/2018 | Choi | H04L 63/102 |
| 10,032,171 B2* | 7/2018 | Yeager | H04L 9/321 |
| 10,552,614 B2* | 2/2020 | Nguyen | G06F 21/575 |
| 10,637,650 B2* | 4/2020 | Beiter | H04L 9/3226 |
| 2014/0344904 A1* | 11/2014 | Venkataramani | G06F 21/35 726/5 |
| 2015/0281227 A1* | 10/2015 | Fox Ivey | H04L 63/0853 713/168 |
| 2016/0063313 A1* | 3/2016 | Sandholm | H04L 9/3231 382/118 |
| 2016/0344740 A1* | 11/2016 | Choi | H04L 63/102 |
| 2017/0055146 A1* | 2/2017 | Ko | H04W 12/02 |
| 2017/0244555 A1* | 8/2017 | Beiter | H04L 9/3213 |
| 2017/0374046 A1* | 12/2017 | Narasimhan | H04L 63/06 |
| 2018/0004930 A1* | 1/2018 | Csinger | G06F 21/316 |
| 2018/0131408 A1* | 5/2018 | Austad | G06F 21/606 |
| 2018/0302408 A1* | 10/2018 | Touati | H04L 9/3234 |
| 2019/0340348 A1* | 11/2019 | Yu | A61B 5/681 |

* cited by examiner

SHORT-DISTANCE NETWORK ELECTRONIC AUTHENTICATION

CROSS REFERENCE TO RELATED APPLICATIONS

This application claims priority to U.S. Application Ser. No. 62/445,655, filed on Jan. 12, 2017, which is hereby incorporated by reference for all purposes.

BACKGROUND

The present disclosure relates generally to electronic authentication. In particular, systems and methods of automatic electronic authentication via short-distance networks are described.

Electronic authentication is increasingly becoming a part of everyday life. Nearly everyone, it seems, is registered in a number of information system that require some form of electronic authentication. Common client devices that require authentication include personal computers, tablets, laptops, smart phones etc., and this list is only increasing. Furthermore, many web-based services require their own electronic authentication. Common forms of authentication include passwords, PIN codes and public and symmetric keys. Most of these systems don't share authentication data, and may have differing requirements for authentication input complexity and length. Thus, users must keep track of an ever-expanding array of passwords and PIN codes.

Systems for management of this array of passwords and pin codes are known as credential management systems. Known credential management systems, however, are not entirely satisfactory for the range of applications in which they are employed. One common solution is to simply use the same credentials (e.g. password or PIN code) to access multiple systems. The user is only required to memorize one or few unique credentials and uses them across the multiple systems. The weakness, however, of this approach is that if one single system is compromised, the security of all other systems is compromised as well.

Another approach is for the user to keep a written record of credentials, each of which is unique to each system. This is a relatively secure and private way of storing authentication data. The drawback, however, is convenience as it requires carrying a written record (e.g., notebook) of the credentials and manual input of a data. Furthermore, loss of the written record will result in the user being unable to access any of the many systems requiring credentials.

Yet another approach is local computer credential management software. Such software may encrypt authentication data to multiple system with a single credential and stores them on a local computer. Users need to memorize only a single master password to decrypt other credentials. One benefit of this method is convenience as existing credential management software usually automatically inputs credentials into other software systems. The drawback is that users typically need to enter their master password every time, or they must be cached in memory of the local computer.

Still another approach is cloud-based credential management service. It is similar to local computer management software, the difference being that primary credential storage is in a cloud and users need to authenticate via a credential management service to retrieve credential data for other services. The benefit of this solution is that data is accessible over the internet from multiple devices. The downside of this solution is that reliability and security of this solution depends on a third party in the public cloud. Furthermore this solution requires internet access in order to begin the authentication process.

Thus, there exists a need for credential management systems and methods that improve upon and advance the design of known credential management systems. Examples of new and useful credential management systems relevant to the needs existing in the field are discussed below.

SUMMARY

The present disclosure is directed to methods of short-distance network electronic authentication. In one embodiment, a method includes storing encrypted authentication data for a user and a corresponding encryption key on a mobile device; establishing electronic communication between the mobile device and a computer via a short distance network; detecting a request for user-specific authentication data from a third-party application running on the computer; requesting, via an authentication client on the computer, authentication credentials from an authentication service running on the mobile device; accessing, via the authentication service, in response to the requesting step, the encrypted authentication data and encryption key; decrypting the authentication data using the encryption key via the authentication service; transmitting the decrypted authentication data to the authentication client on the client computer; passing the decrypted authentication data from the authentication client to the third-party application; and authenticating the user in the third-party application.

DETAILED DESCRIPTION

The disclosed credential management systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of credential management systems examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

As used herein, "Personal Mobile Device" means a small computing device that a person can carry with him/her. Examples include smartphones, phablets, smartwatches, tablets etc.

As used herein, "Short-distance Network" means a network, usually wireless, that allows a user to connect two or more devices over a short distance. Example of such networks include: Wireless Personal Area Network (WPAN), including Bluetooth or Bluetooth Low Energy; Wireless Local Area Network, including wireless peer-to-peer networks, like Wi-Fi Direct or Peer-to-peer Wi-Fi, WANET or NFC; Wired peer-to-peer connections that connects two or more devices via cable.

As used herein, "Electronic Authentication" means a process establishing confidence in user identity to an information system. Examples of electronic authentication methods include PIN codes, passwords, public and symmetric keys, and biometrics.

As used herein, "Authentication Data/Credentials" means digital data required to authenticate a user to an information system.

As user herein, "Authentication Service" means an information system providing authentication data to authentication clients upon request over a network.

Figure 3:
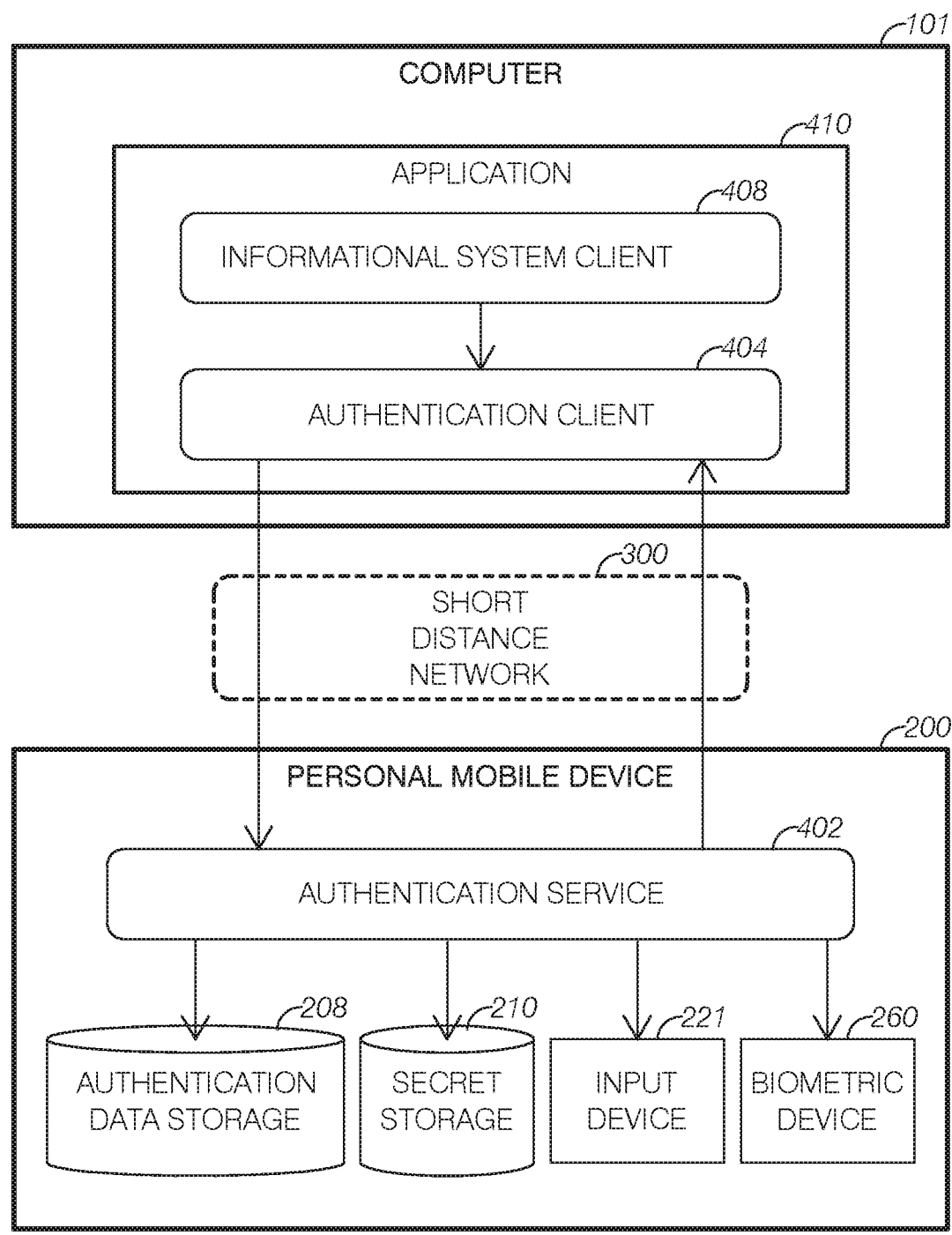
FIG. 3 is a schematic view of a first example of a short-distance network authentication system.

With reference to FIG. 3 a first example of a credential management system, system 50, will now be described. Credential management system 50 functions to securely and conveniently manage a user's electronic authentication credentials across a broad swath of client devices and web clients.

Credential management system 50 addresses many of the shortcomings existing with conventional credential management systems. For example, system 50 allows a user to store authentication data on a mobile device and automatically authenticate to any authorized device connected to the mobile device via a short-distance network. The authentication data stored on the mobile device may comprise a unique password or PIN code for each client device. Thus, in some regards, system 50 combines the advantages of carrying a written record of a slew of unique authentication credentials with the advantages of existing credential management systems, without the drawbacks of either.

As shown in FIG. 3, credential management system 50 includes a personal mobile device (e.g., a smart phone) 200 in communication with a client computer 101 via short-distance network 300. Personal mobile device 200 may include authentication data storage 208, secret storage 210, input device 221 and biometric device 260. An authentication service 402 may be installed and running on mobile device 200. Similarly, client application 410 may be installed and running on computer 101. Client application 410 may include an authentication client 404 and an informational system client 408.

The authentication client 404 of application 410 on computer 101 functions to request authentication credentials from the authentication service 402 on mobile device 200. Authentication client 404 must be installed and operational on computer 101 in order to enable the electronic authentication of the invention. In one embodiment, authentication client 404 may be a native module of application 410. In other embodiments, application 410 may install the authentication client 404 in situ. For example, in one embodiment, the application 410 may be a web browser and the authentication client 404 may be a as JavaScript module installed to client computer 101 from a binary package or from the respective web store.

Informational system client 408 is an application that may retrieve information from a remote or a local informational system. Informational system client 408 may be a stand-alone application or a component of an existing application. Some examples of informational system clients include: email clients (such as OUTLOOK) which may connect to a remote server to send or retrieve emails; communication clients (such as SKYPE) which may exchange text or voice and/or video; banking applications which may be hosted by a bank for its customers; encyclopedic information databases (such as digital encyclopedia Britannica) which may be accessed via DVDs and or from a local computer; or other database clients (such as ORACLE, MSSQL, etc.) which may facilitate access via local, intranet, intranet or internet databases.

Authentication data storage 208 functions to store a user's unique authentication credentials for devices and/or web services. The authentication credentials stored in authentication data storage are stored in encrypted form. Secret storage 201 securely stores the encryption key to decrypt the encrypted authentication credentials. Examples of such secure secret storage include APPLE Keychain and ANDROID Keystore.

Input device 221, as described below, functions to allow the user to input and store the unique authentication credentials which are then stored in authentication data storage 208. Biometric device 260, as described below, functions to verify the user's identity when necessary.

Authentication service 402 functions to receive a request from authentication client 404 on client device 101, and in response, access the encrypted authentication data as well as the encryption key from authentication data storage 208 and secret storage 201, respectively. The authentication service 402 may decrypt the requested authentication data via the encryption key.

In some embodiments, the authentication service 402 may evaluate whether the requested authentication data requires an additional user authorization step. In this regard, for some authentication data (e.g., bank information), the authentication service may prompt the user for a PIN code via input device 221 or and/or for a biometric identity verification via biometric device.

After the authentication service 402 decrypts the requested authentication data, and optionally verifies the user's identity, the authentication service 402 forwards the decrypted authentication data from mobile device 200 across to the authentication client 404 operating on computer 101 via short-distance network 300.

Short-distance network 300 functions to place mobile device 200 and computer device 101 in electronic communication. In one embodiment, short-distance network 300 may comprise a Wireless Personal Area Network (WPAN) such as Bluetooth or Bluetooth Low Energy, among others. In other embodiments, short-distance network 300 may comprise a Wireless Local Area Network (WLAN). For example, short-distance network 300 may comprise Wi-Fi Direct, Peer-to-peer Wi-Fi, WANET or NFC. In other examples, short-distance network 300 may comprise wired peer-to-peer connections.

Figure 4:
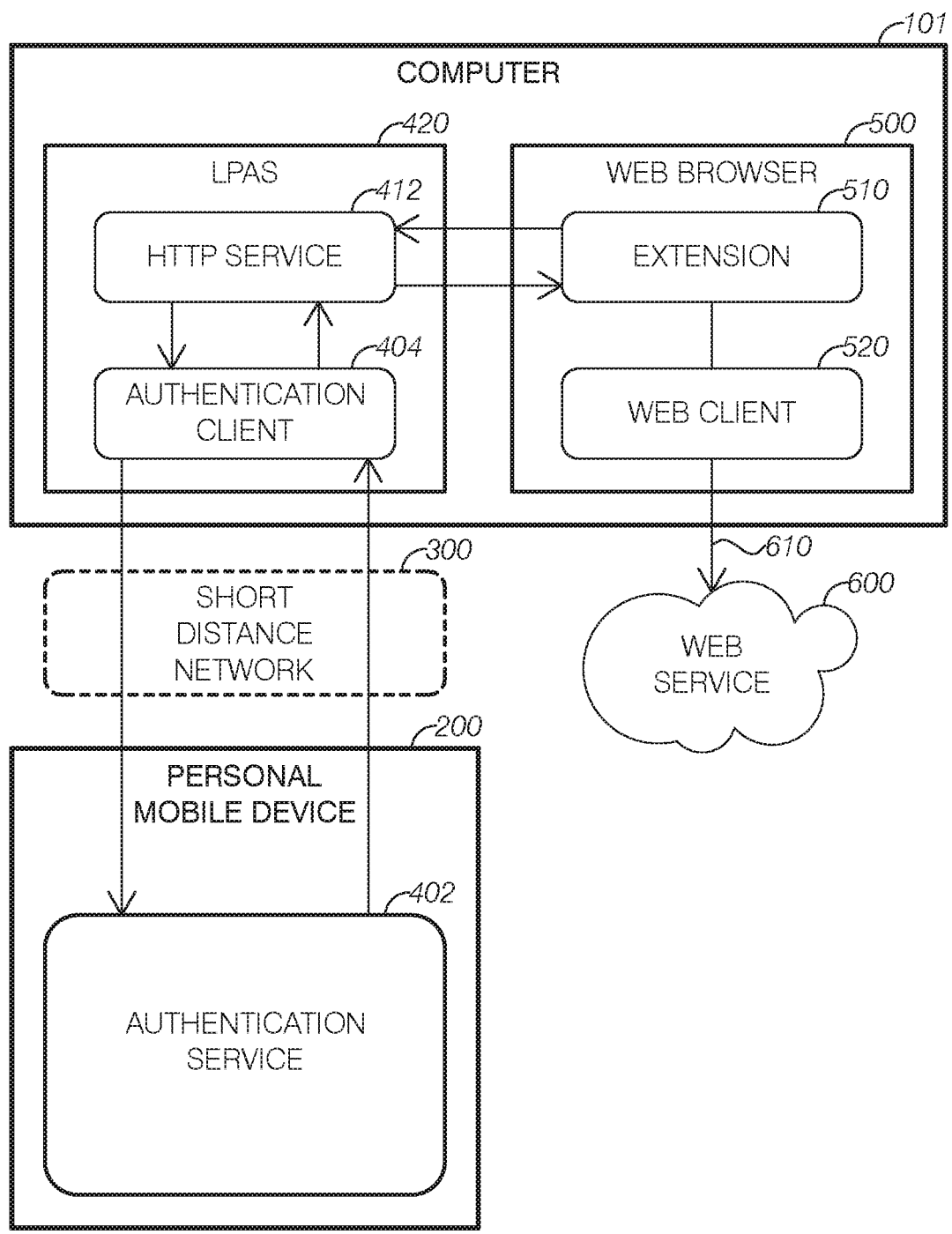
FIG. 4 is a schematic view of a second example of a short-distance network authentication system, including authentication to a web client using a Local Proxy Authentication Service.

Turning now to FIG. 4, a second example of a credential management system used to automatically provide authentication credentials to a web client 520 is shown. The illustrated system includes mobile device 200 and short-distance network 300 as described above, as well as computer 101 in communication with web service 600 via internet connection 610.

Computer 101 comprises Local Proxy Authentication Service (LPAS) 420 and web browser 500. LPAS 420 comprises an authentication client 404 as well as HTTP service 412. Web browser 500 comprises extension 510 and web client 520. In some embodiments, computer 101 may comprise a desktop type CPU. In other embodiments, computer 101 may comprise a second mobile device (such as a mobile phone, tablet, etc. as described below)

The application programming interface(s) (APIs) of prior art web browser extensions generally do not include the capability to access short-distance networks. Browser extensions of the prior art are generally capable of accessing HTTP services on the internet, local networks, and the local computer.

Thus, passing a request and subsequent response for authentication credentials from a mobile device, across a short-distance network, and finally to a web service being accessed on a computer has not been available in the prior art. LPAS 420 of the present invention functions to bridge the gap between a short-distance network and HTTP services. In this regard, LPAS 420 provides an HTTP service interface 412 on computer 101 and can forward a request for authentication credentials from web service 600, through authentication client 404 and to authentication service 402.

Extension 510 may inject into web client 520 and hook onto login requests. Upon detecting a login request, extension 510 sends a request to LPAS 420. LPAS 420 forwards that request on to the authentication service 402 on mobile device 200, as described above. The authentication service 402 the accesses the requested encrypted authentication data from storage 208, accesses the encryption key from secret storage 210, and decrypts the authentication data. Authentication service 402 then responds, via short distance network 300, to the LPAS 420 with the decrypted authentication credentials. The LPAS 420 then passes the decrypted authentication credentials to web browser extension 510. Extension 510 then automatically populates the required fields of the login request.

Furthermore, when a user enters new authentication data, i.e., authentication data that has not yet been stored by the authentication service 420 on mobile device 200, in an authentication form (e.g., login web page) of a web service, extension 510 is configured to detect and read that new authentication data. Extension 510 then passes this new authentication data to the HTTP service 412 of LPAS 420. The authentication client 404 of the LPAS 420 then passes the new authentication data across short distance network 300 to the authentication service 402 of mobile device 200. Authentication service 402 accesses the encryption key from secret storage 210 and encrypts the new authentication data. Authentication service 402 then stores the new encrypted authentication data in authentication data storage 208.

Figure 5:
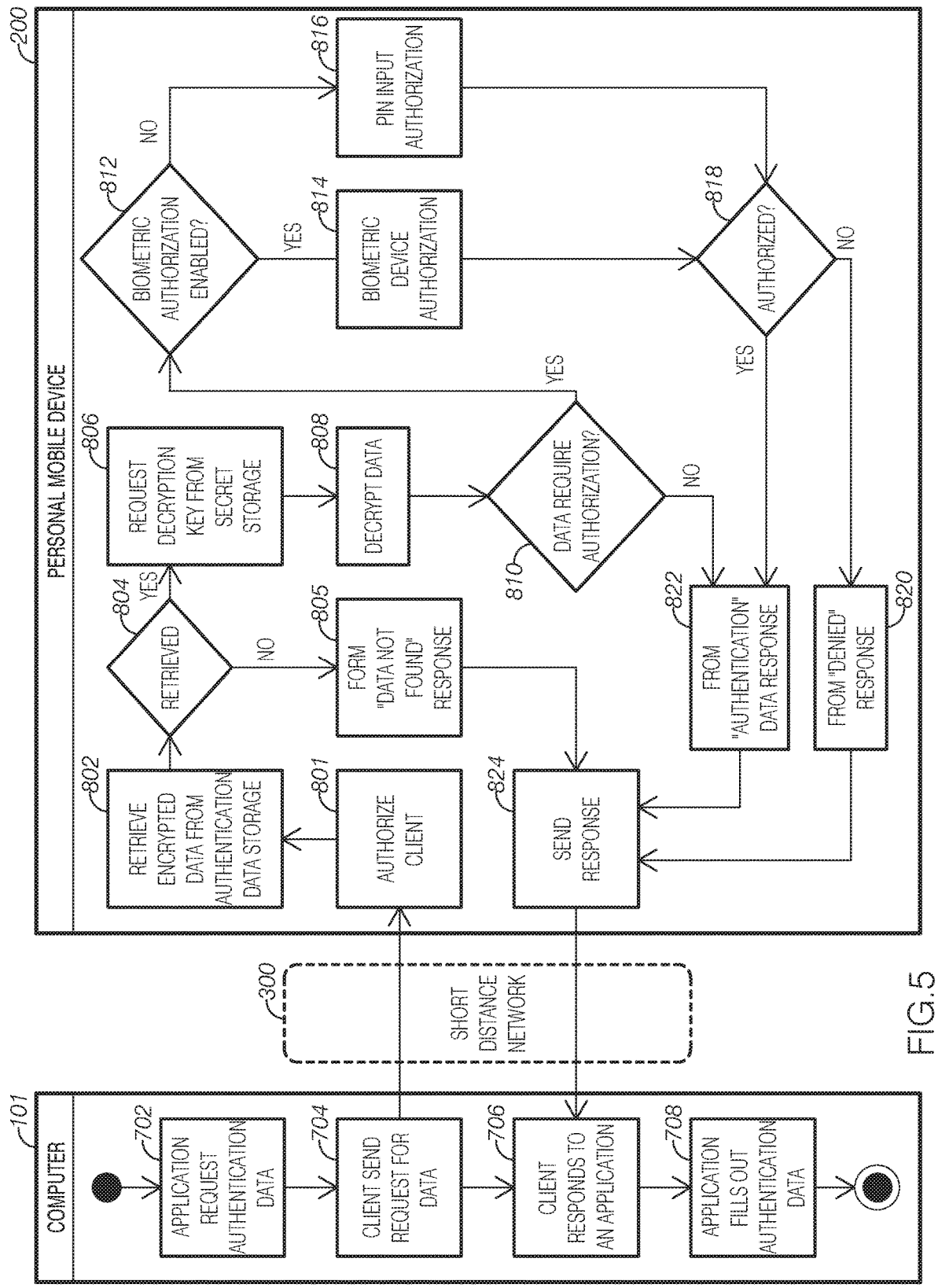
FIG. 5 is a flow diagram of one method of short-distance network authentication.

Turning now to FIG. 5, a method of short-distance network authentication is illustrated. In the illustrated method, an application of computer 101 initiates 702 a request for authentication data. Then, the client forwards 704 that request to mobile device 200 via short-distance network 300. The client is then authorized 801.

In response to authorization of the client, the encrypted authentication data storage is scanned 802 for the encrypted authentication data corresponding to the application that initiated the request. The success of the scanning step 802 is evaluated 804.

If the requested encrypted authentication data was not found in the scanning step 802, a "data not found" response is formed 805. That response is then sent 824 across the short distance network 300 to the client. The client responds to the application 706 and the application responds to the user that the data was not found.

If the requested encrypted authentication data was found in the scanning step 802, the decryption key is requested 806 from secret storage. The requested encrypted authentication data is then decrypted 808 into decrypted authentication data.

The decrypted authentication data is then evaluated 810 for the need to require an additional verification step. If the decrypted authentication data does not require an additional verification step, an authentication data response is then formed 822. The authentication data response is then sent 824 across short-distance network 300 to the computer 101. The application then populates 708 the authentication form with the authentication data.

If the decrypted authentication data requires an additional verification step, mobile device 200 then evaluates 812 whether biometric verification is enabled. If biometric verification is enabled, then the identity of the user is checked 814 via a biometric device of the mobile device 200. If biometric verification is not enabled, then the identity of the user is checked 816 by a PIN via an input device of mobile device 200.

The success of the identity verification is then evaluated 818. If the user's identity can't be verified, then a "denied" response is formed 820. The "denied" response is then sent 824 to client, the client responds 706 to the application and the response is displayed. If the user's identity is verified, then an authentication data response is formed 822. The response is then sent 824 to the client. The client responds 706 to the application. The application populates 708 the authentication form of the application with the authentication data.

In some embodiments, the authentication data may be backed up (i.e., stored in a separate secure storage on a different device from mobile device 200). Such data back-up is initiated from mobile device 200, wherein the encrypted authentication data is sent to an auxiliary device (e.g., a second computer, tablet, etc.) via a network connection.

In some embodiments, the authentication data may be restored from the backed up copy. Such restore operation is initiated from mobile device 200. In response to a request from the authentication service 402, the auxiliary device transfers in encrypted authentication data back onto mobile device 200. The user would then need to input the encryption key in order to decrypt the authentication data.

Figure 1:
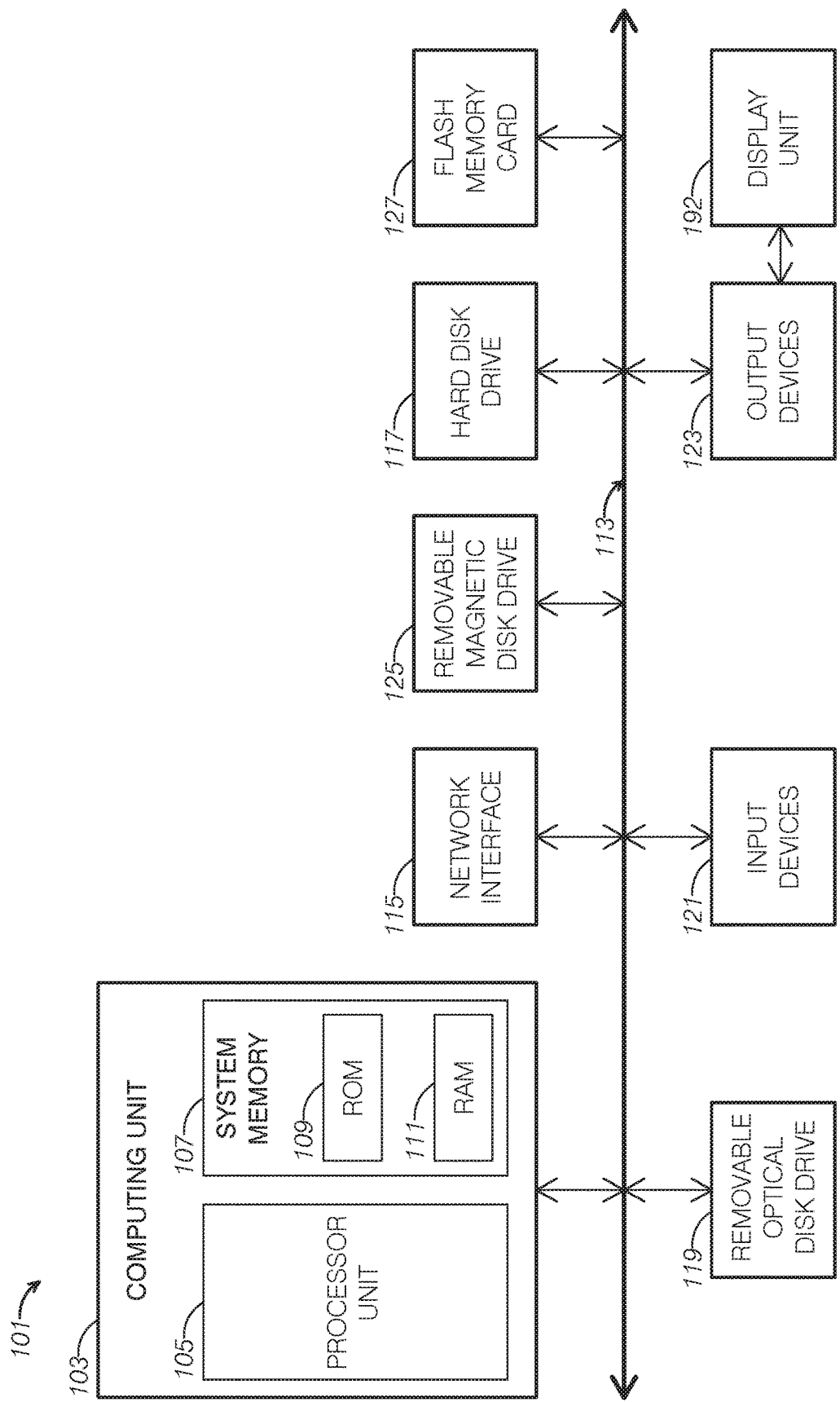
FIG. 1 is a schematic view of an example of a programmable computing device.

FIG. 1 shows one illustrative example of a computing device, computing device 101, which can be used to implement various embodiments of the invention. As seen in this figure, computing device 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated by those of ordinary skill in the art, both read-only memory (ROM) 109 and random access memory (RAM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, and a flash memory card 127. Processing unit 105 and system memory 107 also may be directly or indirectly connected to one or more input devices 121 and one or more output devices 123.

Output devices 123 may include, for example, a monitor display, an integrated display 192, television, printer, stereo, or speakers. Input devices 121 may include, for example, a keyboard, touch screen, a remote control pad, a pointing device (such as a mouse, touchpad, stylus, trackball, or joystick), a scanner, a microphone, a humidity sensor, an ambient light sensor, a GPS (global positioning system) receiver, one or more LPS (local positioning system) receivers, such as a WiFi receiver, a relative humidity sensor, or a camera.

Returning to FIG. 1, computing unit 103 can be directly or indirectly connected to one or more network interfaces 115 for communicating with a network. This type of network interface 115, also sometimes referred to as a network adapter or network interface card (NIC), translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 115 may employ any suitable connection agent for connecting to a network, including, for example, a wireless transceiver, a power line adapter, a modem, or an Ethernet connection.

Of course, still other peripheral devices may be included with or otherwise connected to a computing device 101 of the type illustrated in FIG. 1, as is well known in the art. In some cases, a peripheral device may be permanently or semi-permanently connected to computing unit 103. For example, with many computing devices, computing unit 103, hard disk drive 117, removable optical disk drive 119 and a display are semi-permanently encased in a single housing.

Still other peripheral devices may be removably connected to computing device 101, however. Computing device 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computing device 101 may include a wireless data "port," such as a Bluetooth® interface, a Wi-Fi interface, an infrared data port, or the like.

It will be appreciated that a computing device employed according various examples of the invention may include more components than computing device 101 illustrated in FIG. 1, fewer components than computing device 101, or a different combination of components than computing device 101. Some implementations of the invention, for example, may employ one or more computing devices that are intended to have a very specific functionality, such as a server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer, tablet and/or smartphone. These computing devices may have any combination of peripheral devices or additional components as desired.

In many examples, computing devices may comprise mobile electronic devices, such as smart phones, smart glasses, tablet computers, or portable music players, often operating the iOS, Symbian, Windows-based (including Windows Mobile and Windows 8), or Android operating systems.

Figure 2:
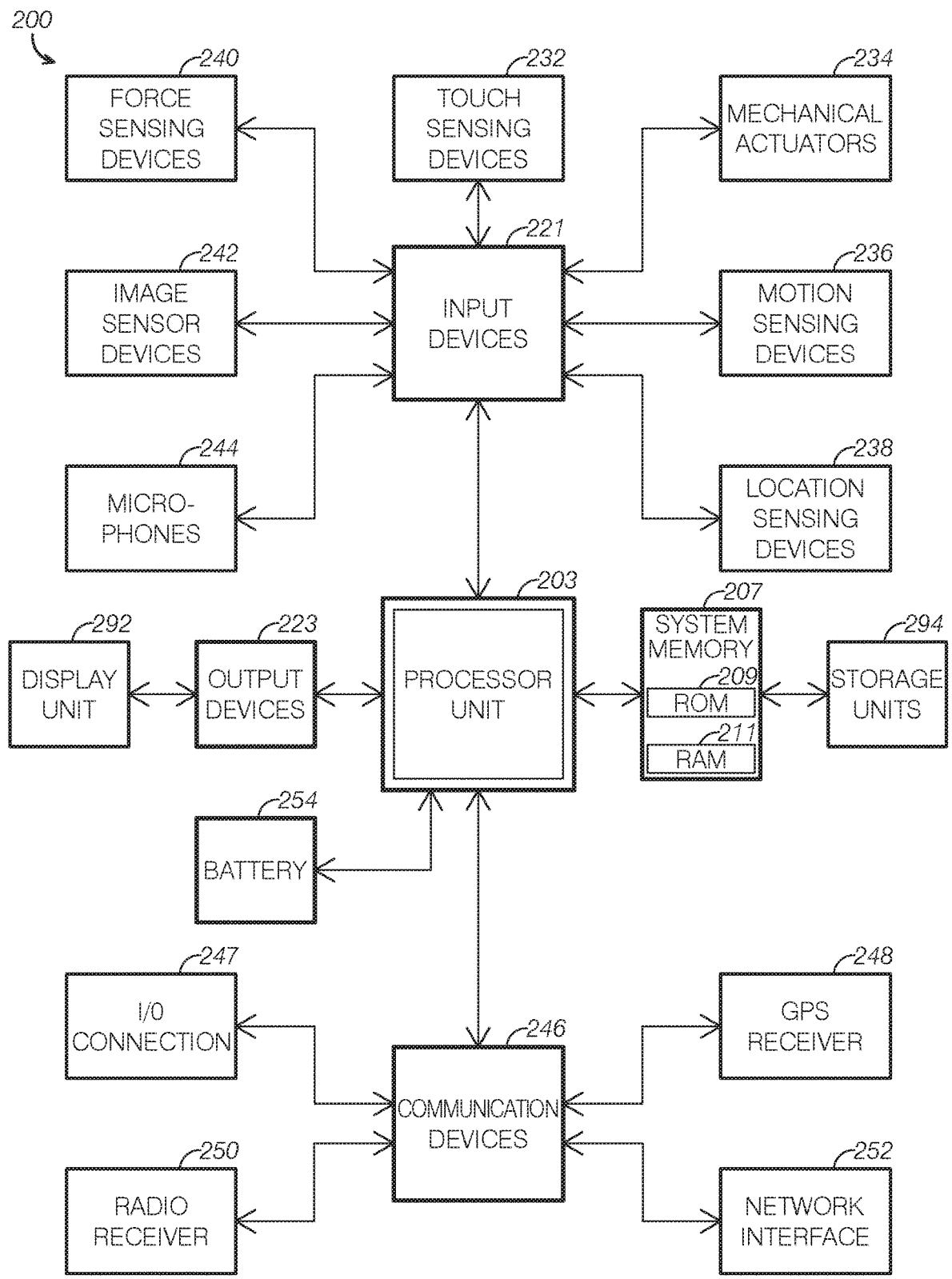
FIG. 2 is a schematic view of an example of a mobile electronic device.

With reference to FIG. 2, an exemplary computing device, personal computing device 200 is shown. Thus, computing device 200 may include similar or identical features to computing device 101. In one example, computing device 200 may include a processor unit 203 (e.g., CPU) configured to execute instructions and to carry out operations associated with the mobile device. For example, using instructions retrieved from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc.

In most cases, the controller together with an operating system operates to execute computer code and produce and use data. The operating system may correspond to well-known operating systems such iOS, Symbian, Windows-based (including Windows Mobile and Windows 8), or Android operating systems, or alternatively to special purpose operating system, such as those used for limited purpose appliance-type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211. Further, system memory 207 may retrieve data from storage units 294, which may include a hard disk drive, flash memory, etc. In conjunction with system memory 207, storage units 294 may include a removable storage device such as an optical disc player that receives and plays DVDs, or card slots for receiving mediums such as memory cards (or memory sticks).

Computing device 200 also includes input devices 221 that are operatively coupled to processor unit 203. Input devices 221 are configured to transfer data from the outside world into mobile device 200. As shown, input devices 221 may correspond to both data entry mechanisms and data capture mechanisms. In particular, input devices 221 may include touch sensing devices 232 such as touch screens, touch pads and touch sensing surfaces, mechanical actuators 234 such as button or wheels or hold switches, motion sensing devices 236 such as accelerometers, location detecting devices 238 such as global positioning satellite transmitters, WiFi based location detection functionality, or cellular radio based location detection functionality, force sensing devices 240 such as force sensitive displays and housings, image sensors 242 such as light cameras and/or IR cameras, and microphones 244. Input devices 221 may also include biometric scanners such as fingerprint readers and/or retinal scanners, among others. Input devices 221 may also include a clickable display actuator.

Returning to FIG. 2, computing device 200 also includes various output devices 223 that are operatively coupled to processor unit 203. Output devices 223 are configured to transfer data from mobile device 200 to the outside world. Output devices 223 may include a display unit 292 such as an LCD, speakers or jacks, audio/tactile feedback devices, light indicators, and the like.

Computing device 200 also includes various communication devices 246 that are operatively coupled to the controller. Communication devices 246 may, for example, include both an I/O connection 247 that may be wired or wirelessly connected to selected devices such as through IR, USB, or Firewire protocols, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable means for transmitting data over a computer network.

Computing device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations described above can be used alone or in various combinations with the credential management methods disclosed herein. The methods disclosed herein can be implemented by software, hardware or a combination of hardware and software. The methods can also be embodied as computer readable code on a computer readable medium (e.g. a non-transitory computer readable-storage medium). The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method comprising:
   receiving, at a mobile device, user specified authentication data,
      wherein the user specified authentication data is a unique password or a unique personal information number (PIN) associated with a client device,
      wherein the client device is remote from a computer and is communicatively coupled to the computer via an internet connection, and
      wherein the authentication data authorizes a web service to be performed by the client device in response to a user request to the client device for the web service;
   encrypting, at the mobile device using an encryption key, the received user specified authentication data;
   storing encrypted authentication data for the user and the corresponding encryption key on a memory of the mobile device;
   establishing electronic communication between the mobile device and the computer via a short distance network;
   detecting a first request for user-specific authentication data from a third-party application running on the computer, wherein the first request for the authentication data is to use the web service that is performed by the client device;
   communicating a second request from the computer to the mobile device, via an authentication client running on the computer, wherein the second request requests the user specified authentication data from an authentication service running on the mobile device;
   accessing, via the authentication service running on the mobile device, in response to the second request, the encrypted authentication data and encryption key stored on the memory of the mobile device;
   decrypting, at the mobile device, the encrypted authentication data using the encryption key via the authentication service;
   transmitting the decrypted user specified authentication data from the mobile device to the authentication client running on the computer;
   passing the decrypted user specified authentication data from the computer, via the authentication client, to the third-party application running on the computer; and
   authenticating the user in the third-party application based on the received decrypted user specified authentication data,
   wherein the web service is performed by the client device in response to the third-party application receiving the decrypted user specified authentication data.

2. The method of claim 1, wherein the third-party application is a web browser.

3. The method of claim 1, wherein the authentication client is a JavaScript module.

4. The method of claim 1 comprising:
after the decrypting the encrypted authentication data using the encryption key via the authentication service, prompting the user to provide additional authorization via the mobile device,
wherein the decrypted user specified authentication data is transmitted from the mobile device to the authentication client running on the client computer in response to receiving the additional authorization from the user.

5. The method of claim 4, wherein the additional authorization comprises a PIN number.

6. The method of claim 4, wherein the additional authorization comprises biometric identity verification.

7. The method of claim 1, wherein the authenticating comprises populating fields of a login request page.

8. The method of claim 1, wherein the short distance network comprises a wireless personal area network.

9. The method of claim 1, wherein the short distance network comprises a wireless local area network.

10. The method of claim 1, wherein the short distance network comprises wired peer-to-peer connections.

11. The method of claim 1, wherein the computer comprises a second mobile device.

12. A method comprising:
receiving, at a mobile device, user-specific authentication data;
wherein the user-specific authentication data is a unique password or a unique personal information number (PIN) associated with a client device;
wherein the client device is remote from a computer and is communicatively coupled to the computer via an internet connection, and wherein the user-specific authentication data authorizes a web service to be performed by the client device in response to a user request to the client device for the web service:
encrypting, at the mobile device using an encryption key, the received user-specific authentication data:
storing encrypted user-specific authentication data for a user and the corresponding encryption key on a memory of the mobile device;
establishing electronic communication between the mobile device and the computer via a short distance network;
detecting, via a web browser extension running on the computer, a first request for the user-specific authentication data from the web service being accessed via the computer, wherein the first request for the user-specific authentication data is to use the web service that is performed by the client device that is communicatively coupled to the computer;
forwarding the first request via a local proxy authentication service running on the computer, to an authentication client running on the client computer,
communicating a second request from the computer to the mobile device via the authentication client, wherein the second request requests the user-specific authentication data from an authentication service running on the mobile device;
in response to the second request, accessing, using the authentication service running on the mobile device, the encrypted user-specific authentication data and encryption key stored at the mobile device;
decrypting the user-specific authentication data using the encryption key using the authentication service running on the mobile device;
transmitting the decrypted user-specific authentication data from the mobile device to the authentication client running on the computer; and
passing the decrypted user-specific authentication data from the authentication client to the web browser extension;
wherein the user is authenticated to use the web service using the web browser extension that is running on the computer.

13. The method of claim 12, wherein the authentication client is a JavaScript module.

14. The method of claim 12 comprising:
after the decrypting the user-specific authentication data using the decryption key, prompting the user to provide additional authorization via the mobile device.

15. The method of claim 14, wherein the additional authorization comprises a PIN number.

16. The method of claim 14, wherein the additional authorization comprises biometric identity verification.

17. The method of claim 12, wherein the authenticating comprises populating fields of a login request page.

18. The method of claim 12 comprising:
detecting new authentication data entered by the user in an authentication form of the web service;
passing the new authentication data to the local proxy authentication service;
transmitting the new authentication data across the short distance network to the authentication service;
encrypting the new authentication data via the encryption key; and
storing the encrypted new authentication data on the mobile device.

19. The method of claim 12, wherein the short distance network comprises a wireless local area network.

20. The method of claim 12, wherein the short distance network comprises wired peer-to-peer connections.

* * * * *